Patented May 1, 1945

2,374,667

UNITED STATES PATENT OFFICE 2,374,667

METHOD OF PLASTICIZING PROTEINS

Charles Dangelmajer, Nutley, N. J.

No Drawing. Application August 7, 1941,
Serial No. 405,785

4 Claims. (Cl. 106—147)

This invention relates to a method of plasticizing proteins, and has particular relation to a method of plasticizing casein and soybean protein, and to mixed plasticizers used in carrying out this method.

One object of this invention is to provide improved plasticizers which may be incorporated with casein and soybean protein and/or solutions of the same and are capable of forming homogeneous products of increased plasticity with casein and/or soybean protein. A further object of my invention is to provide plasticizing agents, which, when incorporated with casein and/or soybean protein, yield plastic products which are adapted to be used particularly for the preparation of coatings, binders, adhesives, plastic masses, moldable compositions, molded articles, paints, self-supporting films, fibers, filaments or in the sizing impregnating and related arts. Other objects and advantages will appear from the following specification and the appended claims.

In the preparation of plastic compositions from casein and soybean protein, it has been suggested to plasticize these materials by the addition of certain substances, such as glycerol, glycols, triethanolamine, and other amines, urea, oils, water-insoluble fatty acids, water-insoluble fatty alcohols, etc. It has been found, however, that the casein products prepared with these ingredients do not exhibit sufficient flexibility, and that, for example, casein coatings on paper, which contained these plasticizers, became brittle under the usual atmospheric conditions after a relatively short period of time.

I have now found that by incorporating with casein or soybean protein certain protein plasticizers together with formamide, or certain protein plasticizers together with various phenol-amine compositions of the type described further below, an unexpectedly high plasticizing effect on casein or soybean protein is obtained. While formamide, or said phenol-amine compositions, and the above referred to protein plasticizers are unable each by themselves to sufficiently plasticize casein or soybean protein I have found that the incorporation of mixed plasticizers which consist substantially of mixtures of formamide with certain protein plasticizers or mixtures of the above mentioned phenol-amine compounds with certain protein plasticizers, results in a high plasticizing effect which is substantially higher than the sum of the plasticizing effects obtained by the individual use of the ingredients contained in the above named mixed plasticizers. I have found that casein or soybean products prepared by means of my mixed plasticizers show an improvement in retaining their flexibility under changing atmospheric conditions.

I have found that amides other than formamides, such as acetamide, can not be substituted for formamide, certain derivatives of formamide, such as methyl-formamide, dimethyl-formamide, ethyl-formamide, and diethyl-formamide may be, however, partly or wholly substituted for formamide. I prefer the use of formamide which yields the best plasticizing effects if other conditions are equal. I have also found that in certain cases the use of formamide in mixture with the above mentioned formamide derivatives is particularly advantageous if the formation of highly elastic films or coatings is desired.

According to an embodiment of my present invention, the plasticizing agent for casein and soybean protein comprises a mixture of formamide with at least one substance selected from the group consisting of glycerol, triethanolamine, diethanolamine, glycerol monoglycolate, triethylene glycol, ethanol acetamide, and ethanol formamide.

According to another embodiment of my invention, casein and soybean protein may be plasticized by means of a plasticizer which comprises a phenol-amine composition which is compatible with said casein or soybean protein, and glycerol. Said phenol-amine composition is obtained by mixing a phenol, such as carbolic acid, cresols, pp'-dihydroxy diphenyl dimethyl methane, p-phenyl phenol, o-cyclohexyl phenol, p-tertiary butyl-phenol, and p-cumylphenol with at least such an amount of an amine that the phenol-amine composition is homogeneously miscible with or dispersible in water and the phenol-amine composition obtained does not act as a coagulating agent on the protein product to be plasticized. Some of the phenols easily form homogeneous products with amines when mixed at room temperatures, while other phenols require heating in order to form a homogeneous product with the amine. As examples of the amines which can be used for the preparation of said phenol-amine compounds, the following may be mentioned: Monoethanol-amine, diethanol-amine, triethanol - amine, tetraethylene-pentamine, ethyl-phenyl-ethanol-amine, morpholine, tri-isopropanol-amine, phenyl-diethanol amine. The best plasticizing effects were obtained by using triethanol amine for the preparation of the phenol-amine compound.

One equivalent of the phenol, such as C₆H₅OH, may be mixed with two equivalents of the amine. Water or an organic solvent, such as ethanol, may be preferably added in some cases in order to facilitate the formation of a homogeneous, liquid composition. In my present specification and claims, the term "phenol-amine-compounds" (or compositions) includes products of the here described type and their mixtures. I prefer to use two equivalents of the amine for each OH-group of the phenol. 9.4 g. of phenol (C₆H₅OH) is, for example, mixed with 28.0 g. of triethanolamine at ordinary temperature. Thereby a homogeneous, liquid substantially water-soluble product results. The products obtained from the other phenols and two equivalents of the amine are also substantially soluble in or substantially homogeneously miscible or dispersible with water or aqueous solutions. In some cases the addition of a solvent, such as ethyl-alcohol to the phenol-amine compound may be desirable in order to improve its solubility or dispersibility.

The individual components of the mixed plasticizer according to my present invention, may be mixed, and the mixture may be added to the composition or solution of casein or soybean protein. It is, however, also possible to individually add said components simultaneously or subsequently or in various phases of the preparation, to the composition or solution to be plasticized.

The casein or soybean protein or their compositions or solutions used in carrying out my invention may contain other admixtures, such as plasticizing or softening agents or the like, other than those mentioned above, and the casein or soybean may be used in mixture with each other or together with other materials, such as other plastic substances, for example, natural or synthetic resins or other plastic proteins, starches, provided of course, that such ingredients or admixtures do not adversely affect the use and the effect of the plasticizers used according to this invention. The aqueous casein solutions plasticized according to this invention may also be used for the preparation of leather finishes or sizes with or without the addition of pigments. They may be mixed with suitable aqueous wax emulsions and aqueous shellac solutions, as used in leather finishes.

These plasticizers may be added to casein or soybean protein and their solutions or compositions in any suitable manner and in any suitable stage of manufacture. For example, in casting films from solutions, the plasticizers may be added to the solutions or they may be incorporated with cast solid or semi-solid films by spraying; or some ingredients of the plasticizers may be added to the solution to be cast and other ingredients may be introduced into the films by spraying. In the preparation of plastic compositions, such as moldable compositions, for example, the plasticizers may be applied prior to, during or after mixing and the ingredients of the mixed plasticizers may be added to the plastic composition individually or as a mixture. The plasticizers may be incorporated with the proteins or their compositions prior to, during or after a hardening treatment. The individual ingredients of the plasticizers used according to this invention may be incorporated with the casein or soybean protein composition in different phases of manufacture, one ingredient prior to and others after mixing of plastic compositions, for example.

In carrying out this invention, any pure or commercial casein and soybean protein may be used, such as, for example, hydrochloric acid casein, sulfuric acid casein, Rennet casein, commercial soybean protein, or purified soybean protein which may contain various amounts of water.

I have further found that the plasticity and resistance to changes of atmospheric conditions of casein and soybean protein products, with which my mixed plasticizers have been incorporated, may be further increased by the addition to said products of small amounts of water-retaining salts, which retard the evaporation of water from the plasticized protein products. Such salts are, for example, ammonium salts, such as ammonium bromide, ammonium chloride, ammonium fluoride, ammonium lactate, ammonium propionate, alkali metal salts of monocarboxylic acids, such as potassium acetate, zinc chloride, calcium chloride, and magnesium chloride. In plasticizing a solution of casein or soybean protein, only those of the above mentioned salts can be used, which do not cause coagulation of the protein products. Salts which coagulate casein or soybean protein from their solutions may be incorporated, however, with solid products which have been plasticized according to this invention, for example as a spray to plasticized, solid films or other articles. Such spray may contain plasticizers or ingredients thereof. Several of the above mentioned salts may also be used for the treatment of the same product simultaneously or subsequently, if the salts used do not form insoluble or difficultly soluble products with each other. It is to be understood that in the present specification and claims the term "water-retaining salts" denotes salts of the above described type and suitable mixtures thereof.

*Example 1.*—20 parts b. w. of lactic acid casein were dissolved in 80 parts b. w. of an aqueous solution containing 0.5 part b. w. of ammonium fluoride, and 4.5 parts b. w. of an aqueous ammonia solution of 20.0%. To the solution thus obtained 4 parts b. w. of formamide and 4 parts b. w. of triethanol amine were added. From this solution films were cast on a glass plate, and dried on the glass plate at about 140° F. to such an extent that they could be removed from the plate. The self-supporting films thus obtained were exposed to air of 35% relative humidity at 140° F. and they retained their flexibility after 6 days' exposure.

Films of similar quality were obtained by adding to 100 parts b. w. of the above described casein solution 4 parts b. w. of formamide and 4 parts b. w. of glycerol, casting the liquid thus obtained to films, and drying said films in the above described manner.

Films obtained from the above described solution by adding to 100 g. solution (a) 4 parts by weight of formamide, or (b) 5 parts b. w. of triethanol amine or (c) 5 parts by weight of glycerol, casting the solutions thus obtained to films and drying the films in the above described manner, became brittle when exposed to air of 35% relative humidity at 140° F., after a few hours (a), after 40 hours (b) and after 40 hours (c), respectively.

*Example 2.*—To 20 parts b. w. of the aqueous casein-ammonium fluoride ammonia solution described in Example 1, 1 part b. w. of glycerol monoglycolate, 1 part b. w. of formamide, and 0.5 part by weight of glycerol were added. Films which were prepared from this solution in the manner described in Example 2, and exposed to air of 35% relative humidity at 140° F., retained their flexibility after 6 days of such exposure.

The plasticity of these films could be further improved by adding to 20 parts b. w. of the casein solution 0.3 to 0.75 part b. w. of ammonium bromide, ammonium chloride, ammonium lactate or potassium acetate.

*Example 3.*—15.0 parts b. w. of p-tertiary butylphenol was mixed with 28.0 parts b. w. of triethanol amine. 1 part b. w. of this phenol-triethanolamine mixture was mixed with 0.5 part b. w. of formamide and 0.5 part b. w. of glycerol and the mixture thus obtained was added to 20 parts b. w. of a 20% aqueous casein solution. This solution was converted into films as described in Example 1, and tested by exposure to air of 35% relative humidity at 140° F. The films retained their flexibility during an exposure of 5 days.

Similar products may be obtained by using other phenols, such as pp'-dihydroxydiphenyl dimethyl methane, o-cyclohexylphenol, p-phenylphenol and p-cumylphenol. The phenols are mixed with two equivalents of triethanolmine for each OH-group of the phenol, and 1 part b. w. of each of these phenol-amine products was used in mixture with the 0.5 part b. w. of formamide and 0.5 part by weight of glycerol, as described above. The films obtained, when tested as mentioned above, retained their flexibility during a period which varied between 1½ days and 5 days.

*Example 4.*—30 parts b. w. of lactic acid casein, 0.75 part b. w. of ammonium bifluoride, 7.5 parts b. w. of glycerol, 15 parts b. w. of an aqueous ammonia solution of 14%, were dissolved in or mixed with 120 parts b. w. of water. To 23.1 parts b. w. of this solution a product was added, which contained 1 part b. w. of phenol ($C_6H_5OH$) and was obtained by mixing 1 equivalent of phenol with two equivalents of diethanol amine. The homogeneous liquid thus obtained was converted into films, as described in Example 2. The films retained their elasticity after an exposure of 56 hours in air of 58° C. and a relative humidity of 35%.

Films of similar quality could be obtained by using a commercial grade para-meta cresol mixture instead of phenol or by using a composition consisting of 0.6–0.7 part by weight of phenol or cresol and 2 equivalents of triethanol amine.

*Example 5.*—30 parts b. w. of soybean protein, 1.5 parts b. w. of ammonium bifluoride, 2.1 parts b. w. of sodium hydroxide, were dissolved in a mixture of 12 parts b. w. of aqueous ammonia of 14%, and 135 parts b. w. of water. To 24.1 parts b. w. of this solution, 1 part b. w. of glycerol and a product was added which contained 1 part b. w. of phenol ($C_6H_5OH$), and was obtained by mixing 1 equivalent of phenol with 2 equivalents of diethanol amine. Films obtained from this solution and treated in the manner described in Example 4 retained their flexibility in air of 58° C. and a relative humidity of 35% after an exposure of 60 hours.

Films of similar quality were obtained by using instead of phenol the cresol mixture mentioned in Example 4, or by using a composition consisting of 0.6–0.8 part b. w. of phenol or cresol and 2 equivalents of triethanolamine.

By adding a small amount, for example 3% to 10% based on the weight of soybean protein, of water-retaining salts, such as $H_4NBr$, $H_4N.Cl$, potassium acetate, ammonium lactate or ammonium propionate to the solution to be cast to films, the plasticity of the compositions can be further increased. Instead of ammonium lactate equivalent amounts of lactic acid and ammonia may be added to the solution.

*Example 6.*—10 parts b. w. of lactic acid casein, 0.3 part b. w. of ammonium bifluoride, 3 parts b. w. of an aqueous ammonia solution of 14%, were dissolved in or mixed with 40 parts b. w. of water. To the homogeneous liquid thus obtained 1.5 parts b. w. of formamide and 1.5 parts b. w. of triethylene glycol (a chemical sold by the firm E. I. Du Pont de Nemours & Co.) were added, and this solution was converted into films in the manner described in Example 2. The films were exposed to air of a relative humidity of 35% at 45° C. and retained their flexibility after an exposure of 72 hours.

*Example 7.*—To 53.3 parts b. w. of a casein solution prepared as described in Example 6, 1.5 parts b. w. of formamide, 1.5 parts b. w. of glycerol and 1.5 parts b. w. of a composition consisting of 1 equivalent of phenol and 2 equivalents of triethanolamine, were added. This solution was converted into films in the manner described in Example 2, and the films obtained were exposed to air of a relative humidity of 35% at 45° C. They retained their flexibility under these conditions after an exposure of 108 hours.

*Example 8.*—To 53.3 parts b. w. of a casein solution prepared as described in Example 6, 1.5 parts b. w. of glycerol and 2 parts b. w. of a composition consisting of 1 equivalent of phenol and 2 equivalents of triethanolamine, were added. This solution was converted into films in the manner described in Example 1, and the films obtained were exposed to air of a relative humidity of 35% at 45° C. They retained their flexibility under these conditions after an exposure of 84 hours.

*Example 9.*—10 parts b. w. of soybean protein, 0.4 part b. w. of ammonium bifluoride, 0.6 part b. w. of sodium hydroxide, and 1.5 parts b. w. of aqueous ammonia of 14%, were dissolved in or mixed with 60 parts b. w. of water at about 75–80° C. To the liquid composition thus obtained, 1.6 parts b. w. of formamide, 2 parts b. w. of glycerol, and two parts b. w. of triethanolamine were added. This solution was converted into films in the manner described in Example 2, but using the solution at 40° to 45° C. and the films obtained were exposed to air of relative humidity of 35% at 55° C. They retained their flexibility under these conditions after an exposure of 120 hours.

*Example 10.*—To 72.5 parts b. w. of a soybean protein solution prepared as described in Example 9, 1.6 parts b. w. of formamide, 2.0 parts b. w. of glycerol, 2.0 parts b. w. of triethanolamine and 2.0 parts b. w. of glycerol monoglycolate were added. Films obtained from this solution in the manner described in Example 2, but using the solution at 40° to 45° C., retained their flexibility after an exposure to air of 35% relative humidity at 55° C. during 160 hours.

*Example 11.*—To 72.5 parts b. w. of a soybean protein solution prepared as described in Example 9, 1.6 parts b. w. of formamide, 2.0 parts by weight of glycerol monoglycolate and 0.8 part b. w. of ammonium lactate were added. Films prepared from this solution in the manner described in Example 2, but using the solution at 40°–45° C., retained their flexibility after an exposure to air of 35% relative humidity at 55° C. during 80 hours.

*Example 12.*—A solution was prepared by dissolving 20 g. casein, 0.6 g. ammonium bifluoride, 1.5 g. formamide, 1.5 g. monomethyl formamide and 12 cc. of 8% aqueous ammonia in 80 g. of water. 22 g. portions of this solution were mixed with (a) 0.8 g. glycerol monoglycolate and 0.8 g. glycerol, and (b) 0.8 g. glycerol, 0.8 g. glycerol monoglycolate and 0.3 g. ammonium propionate. Films prepared from this solution as explained in Example 2 exhibited about the same plasticity as films prepared under similar conditions with the addition of formamide alone, instead of a mixture of formamide and monomethyl formamide.

Similar results may be obtained by using dimethyl formate, monoethyl formamide or diethyl formamide instead of monomethyl formamide in the above example.

The proportions in which the individual ingredients are used in the mixed plasticizers according to my present invention, may vary within wide limits. The preferred proportions described in the above examples show, however, that the main ingredients are used in substantial amounts, e. g. 25–50% based on the total weight of the plasticizer mixture, in order to obtain optimum effects.

The quantity of the plasticizer mixture added to the protein composition may also vary within wide limits and depends on the use and the desired properties of the plasticized composition. The preparation of products which are distinguished by a high degree of elongation or a great capability of being stretched, requires the use of the mixed plasticizer in an amount up to 50 to 60%, for example, based on the weight of the casein or soybean protein to be plasticized. In other compositions, e. g. in coatings on wood or metal the quantity of the mixed plasticizer may vary between 8 and 15 parts b. w. for 100 parts b. w. of casein or soybean protein. The proper proportion of the mixed plasticizer in the casein or soybean composition also depends, of course, on the ingredients contained in the plasticizer mixture. The proportions of the water-retaining salts in the plasticized composition may also vary, and may amount to 3 to 20% based on the weight of the protein used, for example.

It will be apparent that the advantages to be secured by this invention depend chiefly on the presence of the here disclosed plasticizers in casein and soybean protein compositions although other ingredients may be added to modify the properties of such compositions. My invention, therefore, comprehends broadly the incorporation of the here disclosed plasticizers in casein and/or soybean compositions without limitation as to other suitable materials employed therein and/or the manner or sequence in which said plasticizers or their ingredients are incorporated with said compositions.

Numerous modifications and variations of the invention, as hereinbefore set forth, may be made without departing from the spirit and scope thereof, and therefore only such limitations should be imposed as are included in the appended claims.

I claim:

1. A plasticizer for a protein substance selected from the group consisting of casein and soybean protein, said plasticizer consisting of glycerol, formamide, and at least one substance selected from the group consisting of diethanol amine, triethanol amine, glycerol monoglycolate, triethylene glycol ethanol acetamide, and ethanol formamide.

2. A plasticizer for a protein substance selected from the group consisting of casein and soybean protein, said plasticizer consisting of glycerol, formamide, and at least one substance selected from the group consisting of diethanol amine triethanol amine, glycerol monoglycolate, triethylene glycol, ethanol acetamide, ethanol formamide and a water retaining salt.

3. A plasticizer as claimed in claim 1, in which formamide is at least partly substituted by a formamide derivative selected from the group consisting of methyl formamide, dimethyl formamide, ethyl formamide and diethyl formamide.

4. A plasticizer as claimed in claim 2, in which formamide is at least partly substituted by a formamide derivative selected from the group consisting of methyl formamide, dimethyl formamide, ethyl formamide and diethyl formamide.

CHARLES DANGELMAJER.